May 19, 1964
H. A. SEELE
3,133,981
APPARATUS AND METHOD FOR FEEDING, FORMING
AND SWAGING PANEL INSERTS
Filed Oct. 5, 1959
3 Sheets-Sheet 1
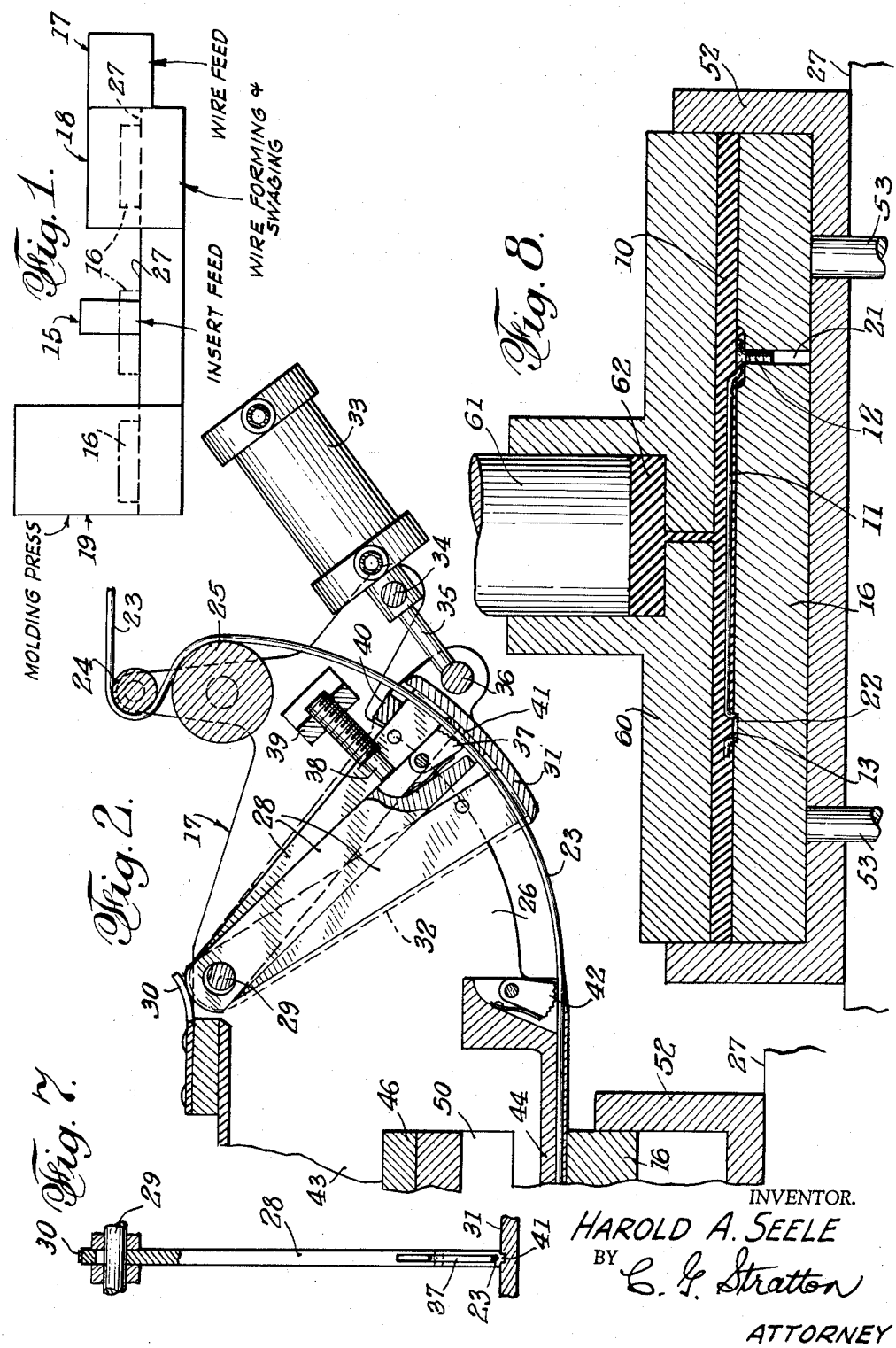
INVENTOR.
HAROLD A. SEELE
BY C. G. Stratton
ATTORNEY

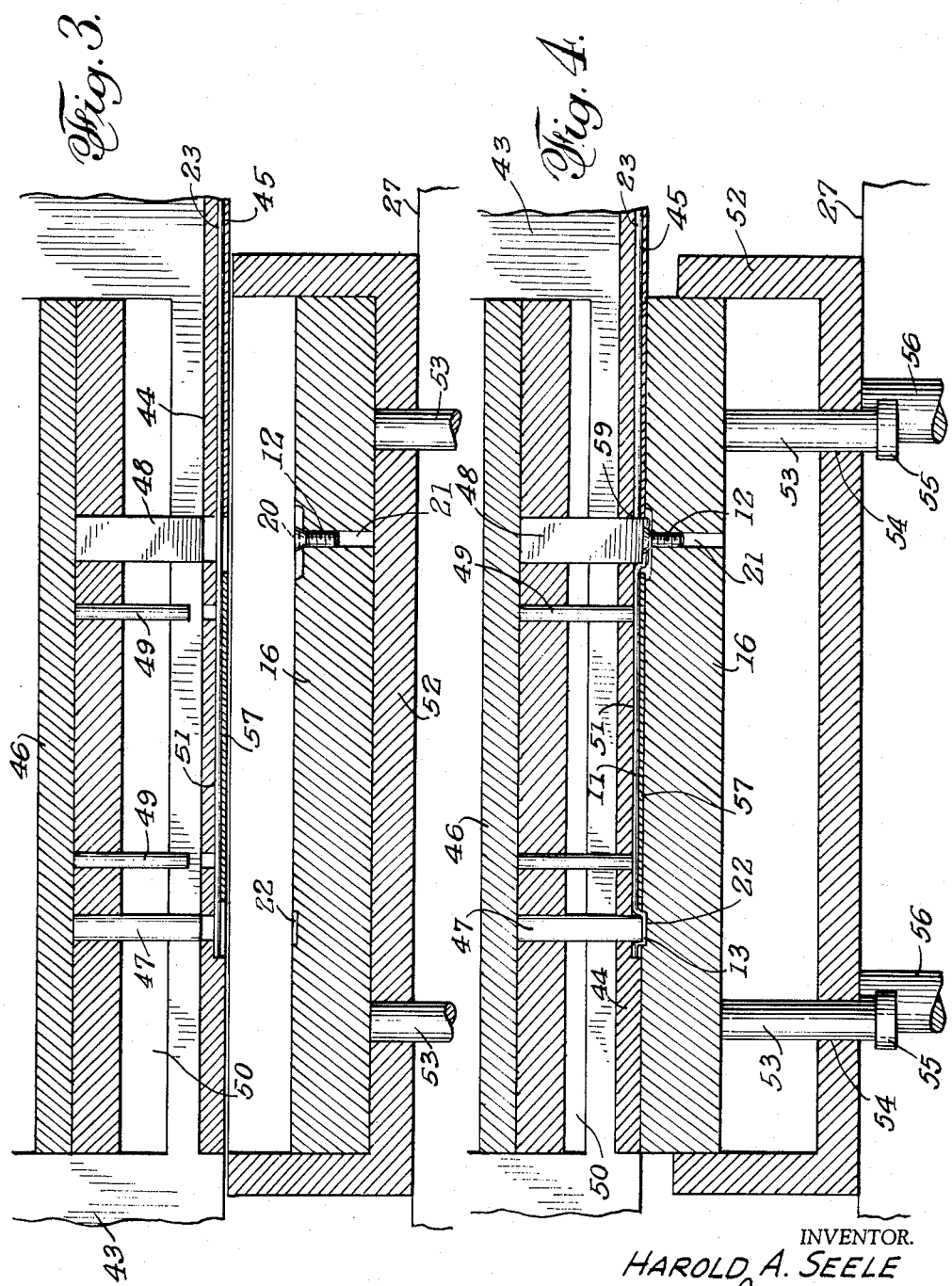

May 19, 1964  H. A. SEELE  3,133,981
APPARATUS AND METHOD FOR FEEDING, FORMING
AND SWAGING PANEL INSERTS
Filed Oct. 5, 1959  3 Sheets-Sheet 3
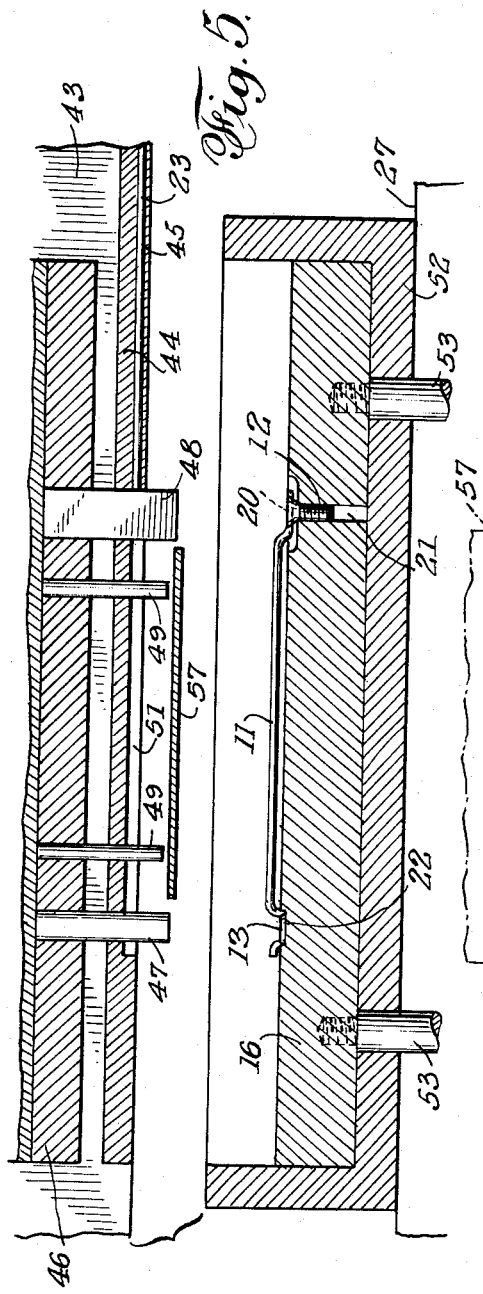
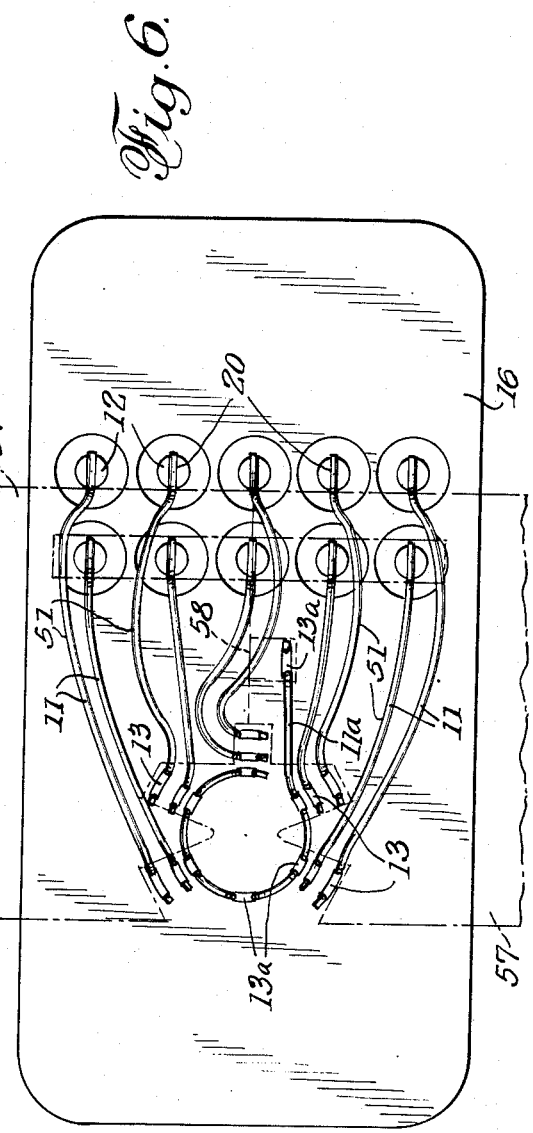
INVENTOR.
HAROLD A. SEELE
BY C. L. Stratton
ATTORNEY

United States Patent Office 3,133,981
Patented May 19, 1964

3,133,981
APPARATUS AND METHOD FOR FEEDING,
FORMING AND SWAGING PANEL INSERTS
Harold A. Seele, 2311–21 Southwest Drive,
Los Angeles 43, Calif.
Filed Oct. 5, 1959, Ser. No. 844,375
13 Claims. (Cl. 264—261)

This invention relates to apparatus and a method for feeding, forming and swaging panel inserts, and it is an object of the present invention to provide such an apparatus and method that, by the simple feed of a plurality of wires to a mold cavity and swaging of said wires to form portions thereof into exposed contacts, a panel assembly is provided that is inexpensive and completely integrated in a manner to obviate accidental displacement of said wires.

Another object of the invention is to provide an apparatus and a method whereby a plurality of differently placed and formed elongated electrical elements are provided in a mold cavity in a manner that embeds said elements within a molded part or panel to provide an integrated assembly, as above indicated.

A further object of the invention is to provide an apparatus and method, as above, in which feed of said elements is simultaneous and swaging of contact portions on said elements, after feed, is simultaneously effected.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

FIG. 1 is a schematic side view of apparatus that embodies the present wire feeding means and the means that forms and swages the wires before the same, by molding, are incorporated in a dielectric panel.

FIG. 2 is an enlarged longitudinal sectional view of the wire feeding means of the apparatus.

FIG. 3 is a fragmentary longitudinal sectional view of the means that forms and swages the wires, the same being shown with the wires at the end of their feed and before swaging of contacts thereon.

FIG. 4 is a similar view of said means in the swaging and cutoff position thereof.

FIG. 5 is also a similar view of said means immediately prior to transfer of a mold part, onto which the wires have been placed for swaging and cutoff, to the molding press of FIG. 1.

FIG. 6 is a top plan view of the mold part as provided with the wires above mentioned.

FIG. 7 is an elevational view, partly in section, of a wire feed bar, as used in the present invention.

FIG. 8 is a longitudinal sectional view of a mold press, as in FIG. 1, showing the manner of enclosing the wires, that are fed to the mentioned mold part, in a dielectric panel, as herein contemplated.

The cross-sectional showing of a molded panel 10, such as illustrated in FIG. 8, is typical in that the same shows one wire 11 of a plurality of similar but differently formed wires embedded in said panel, a terminal insert 12 to which one end of said wire is affixed, as by swaging, and a contact portion 13 at the other end of the wire and formed by swaging, the same being so displaced relative to the panel thickness as to be exposed for wiping engagement by a brush or other such element.

It will be clear from FIG. 6 that the wires 11 are of different length and differently formed so as to be electrically spaced from each other, and that the terminal inserts 12 may have a regular arrangement to serve as binding screws or posts that connect in electric-circuit with means controlled by the panel assembly. It will also be clear that said wires 11 and their terminals and contacts, once embedded in the panel 10, cannot shift and thereby accidentally become electrically shorted.

FIG. 1 shows apparatus that comprises an insert feed mechanism 15 that places a complement of terminal inserts 12 in a mold part 16, a wire feeding unit 17, a forming and swaging unit 18 to which the mechanism feeds wires 11, the forming and swaging being carried in combination with the mold part 16 while the same is positioned in the unit 18, and a molding press 19 to which the insert- and wire-provided mold part is transferred and in which the panel assembly is completed by enclosing the wires 11 and parts of the inserts 12 in a dielectric mass of panel shape.

The insert feed mechanism 15 does not comprise part of the invention, as presently disclosed. While the same may comprise a novel means for placing a complement of terminal inserts 12 in a mold part, it is here shown only as an adjunct to the feeding, forming and swaging means and for the particular purpose of so placing the inserts that the slots 20 thereof are oreinted, as desired. Insofar as the present method is concerned, the mechanism 15 may be omitted and the inserts 12 placed by hand in seats 21 provided in the mold part 16. In the present case, it is desired that the insert slots 20 be all longitudinally oriented, as shown in FIG. 6.

The mold part 16 may be variously designed. The same is here shown as a member that has the mentioned seats 21 provided therein as well as a complement of swaging recesses 22.

The wire feed mechanism 17 is shown best in FIG. 2. While only one wire 23 is shown therein, it will be understood that plurality of wires may be arranged in parallelism and fed from separate spools. Since FIG. 6 shows ten inserts 12, ten wires 23 may be trained to move between feed rolls 24 and 25 to the mechanism 17 for feed to the means 18.

The means 17 is shown as a frame 26 that is mounted to reciprocate up and down relative to a fixed trackway 27 that extends from the means 18 to the molding press 19. Said frame carries a complement of feed bars 28 (in this case, ten) that are mounted on a cross pivot pin 29 and are biased by spring fingers 30 in a direction toward the curved shoe portion 31 of a carriage 32 also mounted on pivot pin 29.

Said carriage 32 is moved between feed direction and retractive direction by a hydraulic unit 33, said unit being carried by the frame 26, as on a pivot 34, with its actuating stem or rod 35 connected to the carriage, as by a pivot 36.

Each feed bar 28, when moved to the left in FIG. 2, will feed a wire 23, by means of the gripping engagement of a dog 37. The distance of feed is different for each of the ten wires. To this end, each feed bar 28 is engaged, with an adjustable stop 38 carried by a cross plate 39 on the frame 26, to be in a different start position, and the feed movement of said bars varies because the same are engaged by a cross plate 40 on the carriage 32 and moved thereby at different feed increments according to the initial adjusted positions of said feed bars. Thus, although the feed projection of the stem 35 is arranged to provide full feed movement of the bar 28 that has the longest feed movement, the remaining bars will be successively picked up by the plate 40 and cause commensurately shorter feed movements thereof.

The dogs 37 pull the wires 23 in feed direction by gripping the same against the end walls 41 of the bars 28. Upon recovery movement of the stem 35, the bars are returned to their initial positions against the differently adjusted stops 38, the dogs 37 slipping over the wires which are held against retraction by a complement of dogs 42 (that yield to feed movement of the wires) by locking against back lash of the wires after feed.

In the above manner, all of the wires 23 are fed simultaneously albeit the length of feed is different for each wire, as above explained. It will be noted that the wires, beyond the feed roll 25, are trained in arcuate form according to the arcuate path of the ends of the feed bars.

The wire forming and swaging unit 18 is shown in FIGS. 3, 4 and 5 in three operative positions thereof. The same comprises an extension 43 of the reciprocating frame 26, a wire feed guide 44 arranged to have guide holes 45 through which the wires 23 are pushed by the feed bars 28, and a fixed bracket 46 on which is carried a complement of swaging punches 47, combined swaging and cutoff punches 48, and a suitable number of ejector pins 49. The frame extension 43 is provided with an opening 50 in which the bracket 46 extends and of a size to allow the mentioned vertical reciprocation of the frame 26 and the wire feed guide 44.

It will be clear that each guide hole 45 opens into a guide slot 51 so that, as seen in FIG. 3, the wires 23 are positioned in the guide 44 as fed by the means 17. It will be clear that such feed may occur during the time the mold part 16 is in molding position in the press 19 and thereafter in position relative to the insert feed mechanism 15.

After the mold part 16 has received its complement of inserts 12, the same is moved along the trackway 27 to a position beneath the guide 44. For this purpose, said part 16 is carried by a housing 52 which is engaged with the trackway 27, said housing carrying said mold part, as shown. As best seen in FIG. 4, the mold part is provided with downreaching studs 53 that pass through suitable openings 54 in the bottom wall of housing 52, said studs being provided with heads 55 that when the mold part 16 is in the mentioned position beneath the guide 44, are engaged with operating rods 56 that, by reciprocative movement, raise and lower said mold part in the housing 52.

The unit 18 is shown as provided with wire-supporting plates 57 that are in position to help guide the wires 23 as they are fed along the guide slots 51. Said plates separate along a line 58 so they may be laterally withdrawn after the wires have been fed. However, before such lateral withdrawal occurs, the guide 44 is moved upwardly to bring the operating ends of the swages 47 and 48 into swaging engagement with the wires 23. This movement of the guide is accompanied by a greater upward movement of the mold part 16 so that the latter forms a backing for the swages as the swages 47 deform the wires to form contacts 13 and the swages 48 first force the wires into the insert slots 20 and then sever the same at 59 to separate the insert wires 11 from the original wires 23 as fed to the machine. FIG. 4 shows this condition wherein it is revealed that the plates 57 remain in support position with respect to the wires 11 to insure that the same will extend along the guide slots 51 and safely inward of the lower surface of the wire guide 44.

Since the swages 47 force the formed contacts 13 into the recesses 22 where the latter are wedged, and the wires are firmly wedged, as stated, into the terminal slots 20, upon withdrawal of the plates 57, the punches 47 and 48 together with the ejector pins 49, strip the wires 11 from the guide 44, leaving the same in position on the mold part 16. Thus, as seen in FIG. 5, upon downward retraction of said mold part 16 into the housing 52, the wires 11 are held in position ready to be embedded in the molded plate 10.

As can be seen from FIG. 8, upon transfer of the mold part 16 into register with an upper mold part 60 of the molding press 19, the usual type of ram 61 may be projected to force molding compound 62 into the space between the mold parts 16 and 60 to form the panel 10 and to integrate the assembly by embedding the wires 11 into said assembly. The molded element will come away with the upper mold 60 from which it may be stripped away. Thus, the mold part 16 is now ready to be moved to the insert placing position in register with the means 15 where the cycle of operation begins anew.

As can be seen in FIG. 6, a wire 11a may be incorporated in the panel 10, said wire being provided with several swaged contacts 13a but not having a terminal 12, as for the wires 13. It will be clear that such a wire 13a may be provided by proper design of swaging and cutoff punches, without materially differentiating from the means and method that utilizes terminal inserts, as described.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what I claim and desire to secure by Letters Patent is:

1. Apparatus for feeding, forming and swaging panel inserts comprising a feed guide for wires and having a plurality of guide channels each having a shape different from the others; means to simultaneously feed a plurality of wires into the respective guide channels of the feed guide; individual means to engage each wire to control the length of feed of each said wire as the wires enter the guide channels and conform to the different shapes thereof; a first mold part; means, operative at the end of the feed of the wires, to simultaneously swage portions thereof, cut off the same adjacent to one of the swaged portions, and displace the cut-off wires from the channels and deposit them on and entirely within the perimeter of the said mold part in position to be enclosed in molding material; and a second mold part normally offset from the first mold part when the latter part is in wire-receiving position; said two mold parts, when the first part is brought into register with the second part, cooperating to form a cavity partly around the wires to receive molding material under pressure to embed said wires in the molding material.

2. Apparatus according to claim 1 provided with means to retractively move the wire-feeding means after feed of wire to the mentioned feed guide; and means to hold the wire fed to the guide channels against retractive movement during retractive movement of the wire-feeding means.

3. Apparatus according to claim 1 in which the wire-swaging means operates to press the swaged portions of the wires into frictional engagement with the first mold part to, thereby, hold the wires immovable during embedding thereof.

4. Apparatus according to claim 3 provided with a straight-line pathway to guide movement of the mold part from juxtaposition to the open guide channels to an offset position with respect to said open guide channels, and a second mold part in register with the first mold part, when in said offset position, to compress a mass of molding material around the wires in the first mold part.

5. Apparatus according to claim 1 in which retractable support plates are positioned to close said open channels during feeding and swaging of the wires, and means, upon retraction of the support plates, to eject the severed wires from their open channels onto the mold part.

6. In combination, a guide member having a plurality of longitudinally open wire-guiding channels, means to feed wires endwise into said channels, a first mold part positioned in juxtaposition to said guide member, means to simultaneously swage portions of said wires against the mold part, sever the same, and eject the severed and swaged wires from the guide member onto the adjacent side of said mold part; a second mold part normally offset from the first part; and means to guide movement of the first mold part into register with the second mold part; said registered mold parts defining a cavity, partly around the wires on the first mold part, for receiving molding material under pressure to embed said wires in the molding material.

7. The combination according to claim 6 in which is provided laterally retractable support plates interposed between the guide member and the mold member to enclose the wires during endwise feed thereof.

8. The combination according to claim 6 in which is provided laterally retractable support plates interposed between the guide member and the mold member to enclose the wires during endwise feed thereof, and means carried by the mold member to frictionally engage the cut ends of the wires to hold the same in position relative to the molding face of the mold member.

9. A method of the character described that consists in feeding a plurality of wires in an endwise direction and guiding the wires being so fed along separate and varying paths, and then simultaneously swaging portions of the wire and transferring them from said path onto the molding surface of a mold member, and spreading molding material over the molding surface to envelop the wires thereon and leave the swaged portions exposed.

10. The method according to claim 9 including the step of providing the mold member with a slot-provided insert, in the slots of which the wires are inserted during transfer from their paths of feed.

11. The method according to claim 9 in which the wire-feeding step is controlled to cause simultaneous feed of wires at different lengths of feed.

12. The method according to claim 9 in which the transfer of the wires to the molding member is effected in a direction at right angles to the direction of wire feed.

13. The method according to claim 9 in which the transfer of the wires to the molding member is effected in a direction at right angles to the direction of wire feed, and the wires are severed before transfer.

References Cited in the file of this patent

UNITED STATES PATENTS

| | | |
|---|---|---|
| 1,728,273 | Hall | Sept. 17, 1929 |
| 2,347,501 | Penker | Apr. 25, 1944 |
| 2,368,389 | Von Knauf | Jan. 30, 1945 |
| 2,450,974 | Mallina | Oct. 12, 1948 |
| 2,600,694 | Sakirsky | June 17, 1952 |
| 2,794,211 | Brown et al. | June 4, 1957 |
| 2,900,662 | Scherry | Aug. 25, 1959 |
| 2,938,939 | Malcolm | May 31, 1960 |